United States Patent [19]

Hammett et al.

[11] 3,825,835

[45] July 23, 1974

[54] SIGNAL-TO-NOISE RATIO MEASUREMENT

[75] Inventors: Robert L. Hammett, Burlingame; Ronald H. Todd, Los Altos; Lawrence W. Templeton, Menlo Park, all of Calif.

[73] Assignee: Hammett & Edison, San Francisco, Calif.

[22] Filed: Sept. 16, 1971

[21] Appl. No.: 180,981

[52] U.S. Cl. ........... 325/363, 178/DIG. 4, 324/57 N
[51] Int. Cl. ......................... G01r 19/10, H04b 1/00
[58] Field of Search ............ 324/57 N; 325/363, 67; 178/DIG. 4

[56] References Cited

UNITED STATES PATENTS

| | | | |
|---|---|---|---|
| 2,881,388 | 4/1959 | Behrend | 178/DIG. 4 |
| 2,883,616 | 4/1959 | Sabaroff | 325/363 |
| 2,988,693 | 6/1961 | Billig | 325/363 |

*Primary Examiner*—Howard W. Britton
*Attorney, Agent, or Firm*—Gregg, Hendricson & Caplan

[57] ABSTRACT

System and apparatus for the measurement of signal-to-noise ratio in electrical signals. An adjustable meter is set to the signal level or known fraction thereof and a square wave is added to the signal for display on an oscilloscope. A pair of vertically displaced oscilloscope traces, both containing the signal and the noise, are displayed and the square wave amplitude is adjusted to move the traces into contiguous or tangent relationship. The measured adjusted square wave amplitude is the signal-to-noise ratio of the electrical signal.

6 Claims, 7 Drawing Figures

INVENTORS
ROBERT L. HAMMETT
RONALD H. TODD
LAWRENCE W. TEMPLETON
BY
Gregg, Henderson & Caplan
ATTORNEYS INVENTORS
ROBERT L. HAMMETT
RONALD H. TODD
LAWRENCE W. TEMPLETON
BY
Gregg, Henderson & Caplan
ATTORNEYS

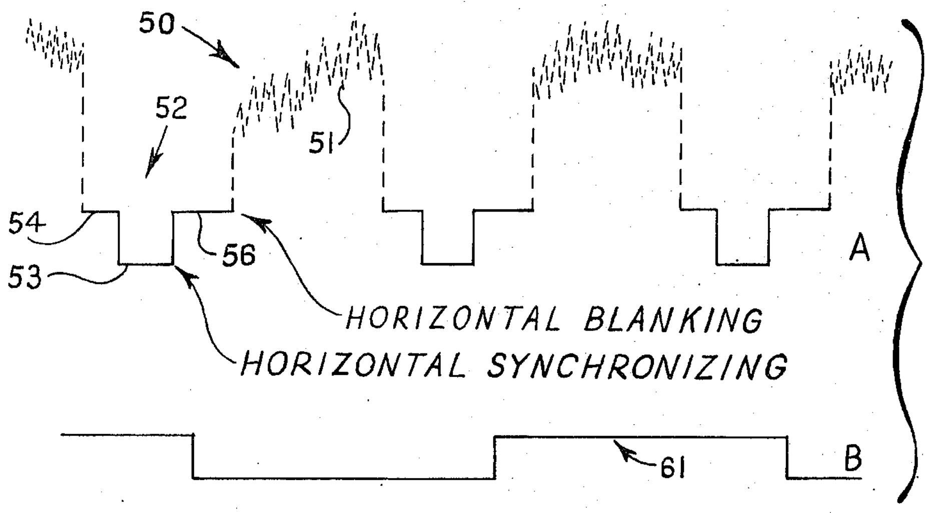
FIG. 5
FIG. 6
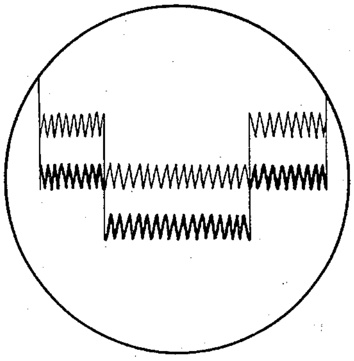
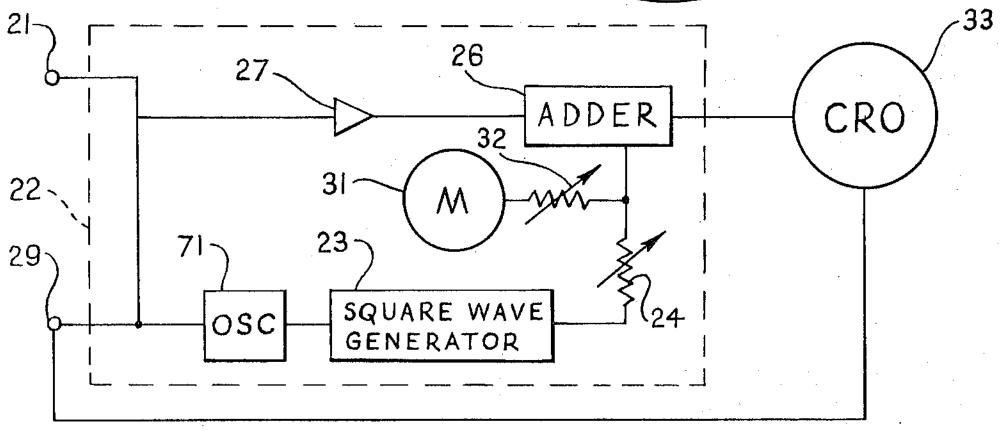
FIG. 7
INVENTORS
ROBERT L. HAMMETT
RONALD H. TODD
LAWRENCE W. TEMPLETON
BY
Gregg, Henderson & Caplan
ATTORNEYS

SIGNAL-TO-NOISE RATIO MEASUREMENT

BACKGROUND OF INVENTION

In the operation of electronic circuitry it is common to grade or determine performance in terms of the amount of noise generated or otherwise included in electrical signals. The term "noise" encompasses a wide variety of signal variations, both as to cause and content. Amplifiers, for example, are commonly rated in terms of figures of merit describing the noise performance of the unit. In this respect a symbol F is commonly employed as a noise figure defined as the ratio of the signal-to-noise power ratio at the input of the amplifier to that at the output. While the absolute value or amplitude of noise level upon a signal may be of interest, it is more common to consider the relative amplitude of the signal itself to the noise level thereon. Commonly the signal-to-noise ratio is taken as a measure of the purity or grade of electrical signals.

The signal-to-noise ratio of a wide variety of different types of electrical signals is commonly taken as a measure of the quality of the signal. Particularly in the field of television it has been found that the signal-to-noise ratio is an important measure of signal quality delivered to the receiver. Considering further the field of television, it is noted that network television programs originating in some few specific locations are commonly transmitted as, for example, via microwave networks with multiple relay stations to local broadcasting stations. Within the local stations the signals are operated upon and re-broadcast either directly to the user or possibly to what is commonly termed cable television head-ends that in turn transmit the signals through wire lines to the users. At various stages in this transmission network it is common to check upon the signal quality as, for example, at microwave relay stations, local television broadcasting stations, and also at various points in cable television systems including the receivers of the ultimate users. Such checking of signal quality should include measurement of the signal-to-noise ratio of the video signal.

There have been developed a number of different systems for measuring signal-to-noise ratio of electrical signals. At the present time there are commercially available at least two different method and means for measuring signal-to-noise ratio. One of these means is only incorporated in complex measuring equipment and the other, which is separately available, is highly complex and extremely bulky. Both of the presently available commercial systems utilizing these means operate upon principles that are different from each other and are different from that of the present invention. Furthermore, presently available systems and devices are not adapted to be physically carried to various sites for measurement as, for example, in the field of cable television wherein the ultimate user may require or request signal quality verification.

In addition to the generalities of signal-to-noise measurements, it is noted that there has been developed and published certain information on tangential noise measurement with regard to a determination of the noise generation in oscilloscope amplifiers. Information with regard to this type of noise measurement has been published in TEKSCOPE of April 1969 and February 1970, published by the Tektronix Company of Portland, Ore. Such measurement which bears at least superficial resemblance to the present invention has apparently been limited to operation upon oscilloscopes for a determination of the noise generation therein.

SUMMARY OF INVENTION

The present invention provides a simple system and apparatus for directly determining the signal-to-noise ratio of electrical signals, particularly in the field of high frequency signals such as those of television and color television. Although the present invention is not limited to operation upon television signals, the following description of preferred embodiments of the present invention is referenced to such application.

It is provided herein that a particular portion of an electrical signal train shall be operated upon for measurement of signal-to-noise ratio. Assuming first that noise signals or noise appearing upon electrical signals is relatively continuous, the present invention provides for adding to a signal in question a square wave having an amplitude in excess of any noise signal amplitude that may be superimposed upon such signal. Referring to television signals that have been demodulated so as to leave only the video portion thereof, it is herein provided that the video signal shall be applied to an adder together with an appropriate square wave signal through a variable attenuator and that the output of the adder shall be applied to the vertical deflection plates of a cathode-ray oscilloscope. The signal in question is also directly used to synchronize the horizontal deflection circuitry of the cathode-ray oscilloscope to thereby provide a stable display upon the tube face wherein two vertically spaced traces are formed. The initial amplitude of the square wave noted above is set to equal the level of the signal in question or a predetermined fraction thereof utilizing the oscilloscope display and a signal amplitude meter connected to the square wave output is then set to a reference reading by adjustment of its sensitivity control.

An operator of the present invention views the vertically displaced traces of signal and noise on the oscilloscope and manually or otherwise adjusts the amplitude of the above-noted square wave to draw the two traces together into contiguous relationship wherein no dark space remains therebetween. This adjusted amplitude of the square wave is then read upon the abovenoted meter as a direct reading of the signal-to-noise ratio of the signal in question being measured.

It has been found that a random choice of human operators may relatively rapidly and with great consistency move the above-described oscilloscope traces into contiguous relationship. With regard to video signals for television, the present invention also provides for the adjustment of the square wave by means of the oscilloscope in such a manner that even untrained operators may readily determine signal-to-noise ratios with the present invention. Further with regard to the determination of signal-to-noise ratios of the video signal of television and color television signals, it is herein provided that the vertical blanking portion of the video signal may be employed for determination of signal-to-noise ratio; so also may the horizontal blanking, and vertical and horizontal sync portions, as well as portions of certain transmitted special signals. It is a requirement of the Federal Communications Commission that the ratio of the maximum signal level to the sync-to-blanking level shall be held constant at 4:1.

This ratio can thus provide a stable signal level reference which, with this invention, corresponds to a signal-to-noise voltage ratio of 8:1, or 18 decibels. The present invention provides for operating with either the vertical sync or horizontal sync signal as reference by employing a square wave of controllable amplitude to visually align upon an oscilloscope screen the displaced sync reference voltage level with the non-displaced vertical blanking voltage level. The meter employed in the present invention is then set to the reference 18 decibel level using its sensitivity control and subsequent measurements, as briefly described above, are accomplished.

It is also provided by the present invention with regard to the measurement of the signal-to-noise ratio of television video signals that operation may be made upon the basis of horizontal sync signals. In this case it is preferably provided that the square waves employed shall be synchronized to have a frequency or repetition rate of one-half of the horizontal sync signal frequency. The reasons for this particular limitation are discussed in some detail below.

The present invention is not specifically limited to the measurement of signal-to-noise ratios of television signals; however, one substantial application of the present invention lies in this field and, consequently, same is chosen herein as a basis for description of preferred embodiments of this invention.

DESCRIPTION OF FIGURES

The present invention is illustrated as to particular preferred embodiments thereof in the accompanying drawings wherein:

FIG. 5 is an illustration of horizontal synchronizing pulses in video signals of a television signal and including an illustration of a square wave that may be employed therewith in accordance with the present invention;

FIG. 6 is an illustration of an oscilloscope display of the horizontal synchronizing pulses of FIG. 5 including noise that may be present with the signal; and FIG. 7 is a schematic illustration of a circuit adapted to measure signal-to-noise ratio utilizing horizontal synchronizing pulses as illustrated in FIG. 5.

DESCRIPTION OF PREFERRED EMBODIMENTS

Figure 1:
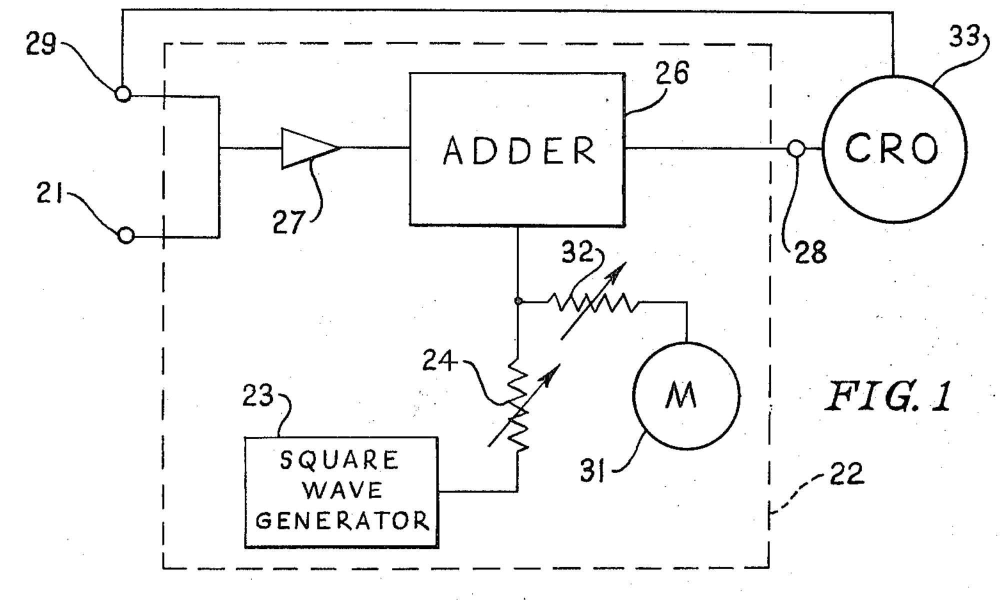
FIG. 1 is a schematic illustration of electrical circuitry for carrying out the present invention.
Figure 2:
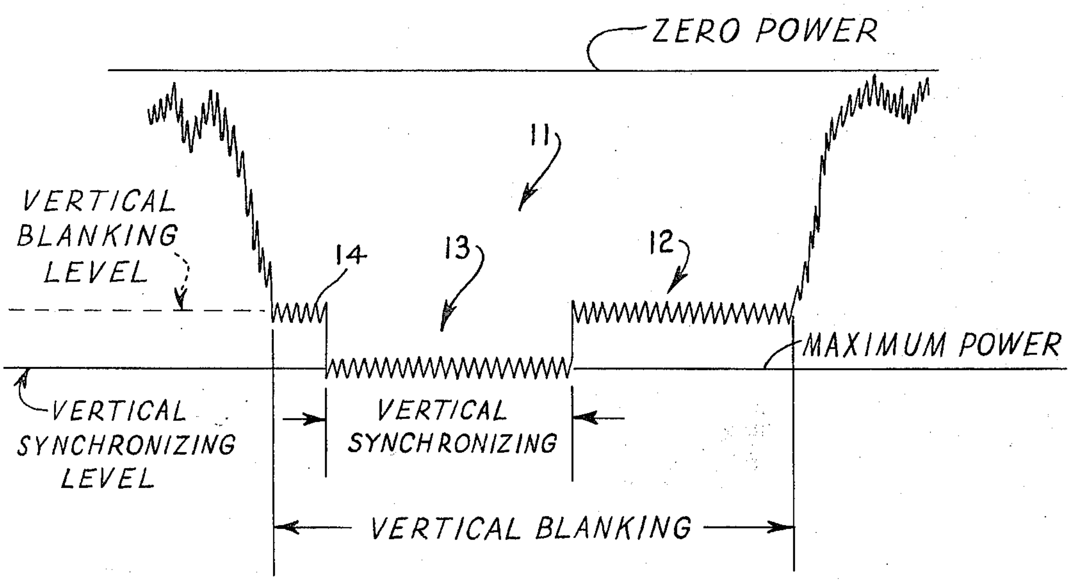
FIG. 2 is an illustration of a portion of a television video signal including noise superimposed thereon.

The present invention is hereinafter described with respect to measurement of the signal-to-noise ratio of the video portion of a television broadcast signal. Reference is first made to FIGS. 1 and 2 of the drawings illustrating at FIG. 1 a schematic illustration of equipment and circuitry that may be employed in accordance with the present invention and at FIG. 2 a wave form operated upon. With regard to video signals for television, it is first noted that same include in addition to the actual video information, vertical synchronizing pulses and horizontal synchronizing pulses. There is illustrated in FIG. 2 the vertical blanking portion 11 of a television signal and including a vertical blanking signal level 12 of the wave form wherein there is provided a negative vertical synchronizing pulse 13 having a predetermined and standardized amplitude difference from the vertical blanking level. The vertical synchronizing pulse has an amplitude equal to what is normally termed the maximum power level of the signal and the voltage amplitude between the vertical blanking level and vertical synchronizing pulse level is a predetermined fraction of the difference between zero power and maximum power of the video signal. In accordance with Federal regulations, the ratio of the synchronizing-to-blanking level voltage of a video signal to the total video signal voltage is 4:1, corresponding in our invention to a signal-to-noise voltage ratio of 8:1 or 18 decibels. In the measurement of signal-to-noise ratio of video signals in television broadcasting then, the present invention employs this relationship to establish a fixed percentage of the total signal as a signal value.

It will be appreciated that random noise signals may appear somewhat as indicated by the wiggly line 14 superimposed upon the wave form of FIG. 2.

Considering now operation upon a video signal, for example, to determine the signal-to-noise ratio thereof, reference is made to FIG. 1 wherein the terminal 21 is considered to be connected to a source of demodulated video signals. This terminal 21 may be provided upon a device or unit 22 incorporating a square wave generator 23 connected through a variable attenuator 24 to an adder 26. The terminal 21 is connected through an isolation amplifier 27 to the adder 26 so that a variable amplitude square wave from the generator 23 is added to the video signal applied to the terminal 21, and the result thereof appears at an output terminal 28 of the unit. There is also provided a sync or synchronizing terminal 29 on the unit 22 and such terminal is internally connected to the input terminal or video signal terminal 21. The square wave generator frequency is preferably approximately 100 KHz for this application but at any rate such frequency is much greated than the repetition rate of the vertical blanking signal.

The unit 22 is also provided with a voltmeter 31 connected to the output of the variable attenuator 24 and having a sensitivity control 32 for setting the meter needle to a reference point on the meter face at a desired setting of the variable attenuator 24. There is also employed in the present invention a cathode-ray oscilloscope 33 which may be entirely conventional and which has the output terminal 28 of the unit 22 connected thereto for display upon the scope face of the signal from the unit. Connection is also made from the synchronizing terminal 29 of the unit to the cathode-ray oscilloscope 33 for synchronizing the horizontal sweep of the oscilloscope with the video wave form.

Figure 3:
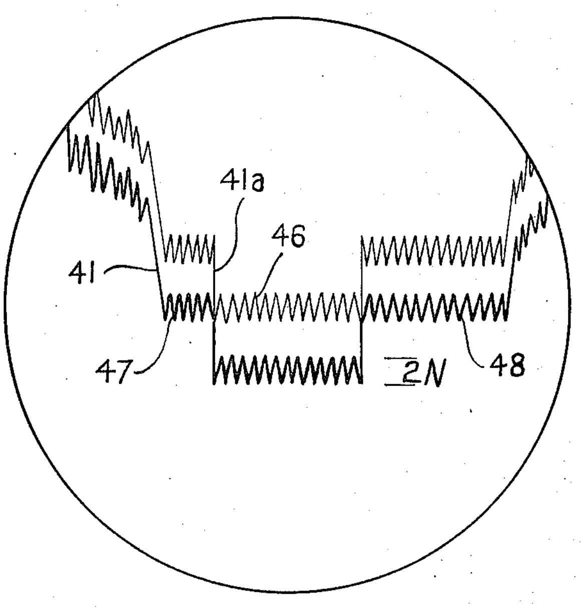
FIG. 3 is an illustration of an oscilloscope display showing one manner of originally establishing a reference point for setting of the signal-to-noise meter of the present invention.
Figure 4:
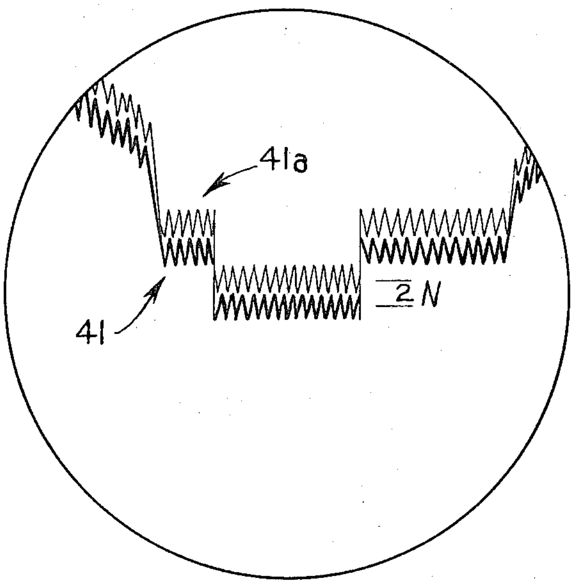
FIG. 4 is an illustration of an oscilloscope display adjusted to establish noise amplitude in the signal displayed.

Considering now the method of the present invention for determining signal-to-noise ratio of video signals, reference is made to FIGS. 3 and 4 of the drawings. Appropriate oscilloscope adjustment will produce upon the screen thereof a trace of the wave form illustrated in FIG. 2 and indicated at 41 of FIG. 3. Superimposed upon this wave form is the signal variation caused by noise in the signal, again as illustrated in FIG. 3. The vertical blanking portion of the video signal at terminal 21 is displayed on the screen, as indicated at 41 of FIG. 3, in the absence of the addition of the square wave to the video signal. The amplitude of the square wave added to the video signal is then slowly increased, for example, from a zero level to cause a pair of traces to appear on the scope face with the second of such traces appearing as indicated at 41*a* of FIG. 3. The amplitude of the square wave is increased until the vertical synchronizing level of the trace 41*a* is horizontally aligned with the vertical blanking level of the trace 41. This is accomplished by visually viewing the scope face and adjusting the attenuator 24 until the vertical synchronizing portion 46 of the upper trace 41*a* is aligned with the front and back vertical blanking levels 47 and 48 of the lower trace 41. It has been found that this adjustment may be readily accomplished with substantial precision by even untrained operators.

With the above-noted adjustment so that the oscilloscope traces appear as indicated in FIG. 3, the sensitivity control 32 of the meter 31 of the unit 22 is set to direct the needle of the meter to the 18 decibel reference mark on the meter face. As noted above, the vertical blanking level to vertical sync level of the video signal is a predetermined fraction of the total video signal level. This percentage has been noted above and corresponds in our invention to a signal-to-noise ratio of 18 decibels.

Following the foregoing operation, the operator then proceeds by viewing the scope face and adjusting the variable attenuator 24 to reduce the amplitude of the square wave from the generator 23 to the point wherein the lower noise extremities of the upper trace in the vertical synchronizing portion of the signal just merge with the upper noise extremities of the lower trace so that no noticeable dark line exists between them. This is illustrated in FIG. 4 wherein it will be seen that the "edge" of the upper trace is tangent with the edge of the lower trace, both during the vertical synchronizing portion of the video signal. At this adjusted level of the amplitude of the square wave added to the video signal, the noise level or amplitude of the noise signal is equal to one-half the square wave amplitude. Consequently it is only necessary for the operator at this point to read the indication of the meter 31 in order to directly determine and, in fact, read from the meter the signal-to-noise ratio of the video signal.

There have been described briefly above the method of the present invention together with a simplified embodiment of the device of the present invention. There may, however, remain in the mind of the reader certain questions with regard to the method and apparatus of this invention. Considering, for example, the above description with regard to the second oscilloscope adjustment illustrated as to its result in FIG. 4, it is noted that the magnitude of the square wave voltage providing for tangency of the total upper and lower traces does indeed equal 2N, the double-amplitude of the noise signal, inasmuch as one-half of the noise double-amplitude appears on each of the traces and the traces are placed in tangency. Thus half the magnitude of the square wave voltage equals N the noise amplitude. Further with regard to the traces appearing upon the scope face, it is noted that the frequency of the square wave from the generator 23 is made sufficiently large that in effect there is produced two separate traces upon the oscilloscope. Naturally if the square wave frequency were relatively low compared to the video signal frequency, this would not be the case. Consequently, the frequency of the square wave is made approximately 2,000 times that of the video repetition, or sync, frequency. This then provides for tracing successive small segments of the video signal at vertically displaced areas of the oscilloscope face, again as illustrated in FIGS. 3 and 4.

Further with regard to determination of signal-to-noise ratio in video signal, for example, it is noted that common terminology employed in the field of electronics for signal-to-noise ratio relates same to a power ratio. Video signals in television, for example, are normally measured as peak-to-peak voltage amplitude of the signal while the noise level is normally measured as RMS, square Root of the Mean Square of the noise voltage, a measure directly related to power. Considering a specific circuit having a peak-peak signal output Speak-peak and a noise output $N_{RMS}$ applied through a resistance to ground, it may then be stated that $P_{Speak\text{-}peak}$ equals $S^2/R$ wherein R is the resistance to ground and $P_{Speak\text{-}peak}$ is the peak-to-peak signal power. Dividing this by $N^2_{RMS}/R$ the RMS noise power then gives the signal-to-noise ratio as determined by the present invention and stated for convenience in decibels.

No attempt is made herein to illustrate or describe details of circuitry that may be incorporated in the unit 22 for establishing particular ratios from the measured quantities. It will, however, be appreciated that by initially setting the meter 31 either to the amplitude of the video signal or to a known fraction thereof and having an appropriate meter scale affixed to the meter 31, subsequent measurement of noise level from this reference level does provide the above-noted signal-to-noise ratio as a direct meter reading. Further to this point, note that using a reference level of square wave amplitude as a full scale meter reading provides that a lower square wave amplitude applied to the meter will produce a meter reading that is, in fact, a ratio to the unity setting of the meter. As here employed, the reference level is calibrated in terms of a known amplitude ratio in the signal so that full scale meter reading represents a known portion of the signal and thus lower amplitude square wave signals read as ratios on the meter have known ratio relations to the signal. The meter is then calibrated in terms of signal-to-noise ratio for a standard reference level for full scale meter reading. It is also noted that provision may be made for selecting one of a number of meter ranges in order to extend the capability of the present invention to various amplitudes and classes of signals as reference.

The method of the present invention and apparatus for carrying out same has been described with respect to the signal-to-noise ratio of a television video signal wherein the vertical blanking portion of the television video signal is operated upon. Still employing the example of a television video signal, it is noted that the horizontal blanking portion of such signal may be employed for determination of signal-to-noise ratio of the signal.

Referring to FIG. 5 there will be seen to be illustrated a portion of a demodulated television signal 50 including the video portion 51 and horizontal blanking portions 52. These horizontal blanking portions include a horizontal synchronizing signal 53 preceded by a short horizontal blanking level signal 54 and followed by a somewhat longer horizontal blanking level signal 56. It is conventional to term the horizontal blanking levels 54 and 56 as the "front porch" and "back porch" respectively of the horizontal synchronizing signal 53. In accordance with the present invention the wave form 50 of FIG. 5A is operated upon to add thereto the wave form of FIG. 5B which will be seen to be a square wave signal 61. It will also be seen that the frequency or repetition rate of the square wave signal 61 is one-half of the frequency of the horizontal synchronizing signal of the wave form 50 of FIG. 5A. In practice the horizontal synchronizing signal of a television signal has a frequency of about 15,750 Hertz and thus the square wave 61 has a frequency of about 7,875 Hertz. It will, of course, be appreciated that these frequencies are herein given as exemplary of the present invention as applied to a particular signal.

It is furthermore provided by the present invention that the signal amplitude transitions of the square wave 61 shall occur during the back-porch portion 56 of the horizontal blanking signal. This is illustrated in FIG. 5. The foregoing limitations are provided herein because of particular characteristics of normal cathode-ray oscilloscopes. Considering a display of the video signal as indicated in FIG. 6, the time required for the electron beam of the oscilloscope to return to the left of the screen is small enough so that all successive horizontal synchronizing signal pulses are displayed on the screen, with the pulse immediately following the last displayed on the right being displayed as the first again on the left of the screen. Thus, in order to display upon the scope face a pair of vertically displaced traces by addition of the square wave to the video signal, it is provided herein that one horizontal synchronizing pulse shall occur during each upper level of the square wave and one during each lower level of the square wave. Consequently there are displayed on the scope both upper and lower traces, as indicated in FIG. 6. It will be seen that this display is substantially the same as the display obtained with vertically synchronizing pulses described above, with exactly 50 percent of the traces occurring as upper or lower traces, a requirement for equal brightness of both traces when tangency is being observed. Having the square wave signal amplitude transitions occur stably during the horizontal back porch assures that these may be readily identified and not confused as noise on the video signal. This confusion could occur when limited bandwidth oscilloscopes are used and the square wave transitions are allowed to occur randomly.

Circuitry for carrying out the method of operating upon horizontal synchronizing pulses of the video signal is schematically illustrated in FIG. 7. This circuit is much the same as the circuit of FIG. 1 and the same numerals are employed for like elements of the circuit in both Figures. It is noted that in the circuit of FIG. 7 provision is made for synchronizing the square wave signals with the video signal and this is illustrated to be accomplished by the connection of an oscillator 71 controlled by the input video signal and driving the square wave generator 23 at one-half the frequency of the horizontal synchronizing signal of the input. Furthermore, the oscillator 71 provides for timing the transitions in amplitude of the square wave to occur in the back-porch region 56 of the horizontal synchronizing signals by a simple phase adjustment. As in FIG. 1, the circuit of FIG. 7 provides for connecting the input signal as a sychronizing signal to the cathode-ray oscilloscope and for adding a variable amplitude square wave to the input signal that is then applied to the oscilloscope for display.

In carrying out the present invention by utilization of horizontal sychronizing signals, the same steps are followed to initially set the meter 31 at a reference value and then to place the vertically displaced traces in tangential relationship by means of the variable attenuator 24 so that the meter then directly reads the signal-to-noise ratio of the input video signal.

It will be appreciated that modifications and variations of the present invention as described above are possible within the scope of this invention. It is again noted that no attempt is made herein to describe electronic circuitry in detail inasmuch as those skilled in the art will be able to employ relatively conventional circuitry to carry out the present invention in accordance with the foregoing disclosure. Additionally, it is not intended to limit the present invention to operation upon a television video signal for the invention is clearly applicable to substantially any type of video signal to determine the signal-to-noise ratio thereof. It is additionally noted that the noise level of signals to be checked or tested in accordance with the present invention is assumed to be some orders of magnitude greater than the noise level of the oscilloscope employed in the testing.

What is claimed is:

1. A method of measuring the signal-to-noise ratio of a wave form having repetitive portions of substantially constant amplitude comprising the steps of:

a. adding to the wave form a square wave signal having a repetition rate that is many times that of said wave form to produce a resultant signal having successive repetitive portions of the wave form at two different amplitude levels,
b. displaying the resultant signal upon an oscilloscope as two vertically separated traces,
c. varying the amplitude of the square wave to a predetermined fraction of the wave form maximum amplitude,
d. measuring the adjusted square wave amplitude as a measure of wave form amplitude,
e. further varying the square wave amplitude to bring said vertically separated traces into tangential relation,
f. measuring the further varied square wave amplitude, and
g. dividing the measurement of step *d* by the measurement of step *f* as a measure of signal-to-noise ratio.

2. A method of measuring the signal-to-noise ratio of a demodulated television signal wave form comprising the steps of:

a. adding to the wave form a square wave signal to produce a resultant signal having successive repetitive portions of the wave form at two different amplitude levels,
b. displaying the resultant signal upon an oscilloscope as two vertically separated traces,
c. varying the amplitude of the square wave to align the vertical blanking level of one oscilloscope trace with the vertical synchronizing level of the other trace at an adjusted square wave amplitude,
d. applying the adjusted square wave to a meter and setting the meter to full scale reading at twice the adjusted square wave amplitude, e. further varying the square wave amplitude to bring said vertically separated traces into tangential relation, and f. applying the further varied square wave of step (e) to said meter to provide a meter reading as the signal-to-noise ratio of the wave form.

3. A method of measuring the signal-to-noise ratio of a demodulated television signal wave form comprising the steps of:

a. adding to the wave form a square wave signal to produce a resultant signal having successive repetitive portions of the wave form at two different amplitude levels, b. displaying the resultant signal upon an oscilloscope as two vertically separated traces, c. varying the amplitude of the square wave to align the horizontal blanking level of one oscilloscope trace with the horizontal synchronizing level of the other trace at an adjusted square wave amplitude, d. applying the adjusted square wave to a meter and setting the meter to full scale reading at twice the adjusted square wave amplitude, e. further varying the square wave amplitude to bring said vertically separated traces into tangential relation, and f. applying the further varied square wave amplitude of step (e) to said meter to provide a meter reading as the signal-to-noise ratio of the wave form.

4. A method of measuring the signal-to-noise ratio of a wave form including noise signals, and having at least two repetitive portions of substantially constant difference in amplitude with such difference having a substantially constant relationship to the maximum amplitude of the wave form, comprising the steps of:

a. adding to the wave form a variable amplitude square wave signal having a frequency substantially in excess of the frequency of said wave forms to form a combined signal, b. displaying the combined signal on an oscilloscope to form two vertically separated traces of the wave form, c. adjusting the amplitude of said square wave signal to equal the difference in amplitude of said repetitive portions of said wave form, d. indicating the adjusted square wave amplitude of step (c), e. varying the amplitude of said square wave signal to bring the vertically separated traces on said oscilloscope into tangential relationship, and f. indicating the ratio of the varied square wave amplitude to adjusted square wave amplitude as a measure of signal-to-noise ratio of said wave form.

5. The method of claim 4 further defined by adjusting the square wave amplitude of step (c) to align the first repetitive portion of the wave form of one oscilloscope trace with the second repetitive portion of the wave form of the second oscilloscope trace.

6. The method of claim 4 further defined by step (e) being carried out by decreasing the square wave amplitude to move the oscilloscope traces together until no dark line remains between the traces in the trace length of one of the repetitive portions of the wave form.

* * * * *